United States Patent Office 2,999,093
Patented Sept. 5, 1961

2,999,093
PREPARATION OF MELAMINE FROM CYANURIC ACID
John D. Christian, Memphis, Tenn., assignor to W. R. Grace & Co., Clarksville, Md., a corporation of Connecticut
No Drawing. Filed Nov. 17, 1959, Ser. No. 853,449
2 Claims. (Cl. 260—249.7)

This invention is directed to the preparation of melamine by heating cyanuric acid at atmospheric pressure at about 350–400° C. in the absence of ammonia and in the absence of a catalyst.

The overall reaction is considered to involve the following steps (with others):

(1)

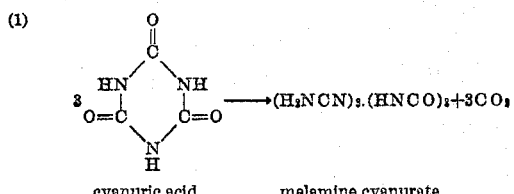

cyanuric acid      melamine cyanurate (2) 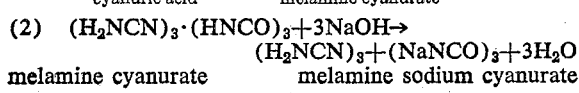

melamine cyanurate      melamine sodium cyanurate

Undoubtedly, numerous intermediate steps are involved, especially in Equation 1.

It will be evident to those skilled in the art that this invention provides a means of proceeding from urea to melamine at atmospheric pressure without a catalyst or dehydrating agent; this is true because cyanuric acid can be made in fair yield simply by heating urea in an open vessel.

It is known to make melamine by heating cyanuric acid in the absence of ammonia at superatmospheric pressure (British Patent 639,962), and cyanuric acid has been converted to melamine at atmospheric pressure in the presence of a catalyst and in the absence of ammonia (Canadian Patent 560,215), but so far as is known, melamine has never been reported as having been made by heating cyanuric acid at atmospheric pressure in the absence of a catalyst.

As already stated, the invention proceeds in the absence of ammonia. As a matter of fact, it is a curious fact that if ammonia be added to the cyanuric acid at the beginning of the heating step, say as a sweep gas, it will simply volatilize away the cyanuric acid (as HNCO vapor), and the vapor product will pass into the atmosphere or condense on the cool parts of the apparatus as a mixture of urea, ammonium cyanate, and cyanuric acid.

The failure of the prior art to bring forth a non-catalytic process for making melamine from cyanuric acid at atmospheric pressure is easy to explain in light of the following discussion.

Since my work indicates that some melamine cyanurate is formed every time cyanuric acid (as such or formed in situ from, e.g., urea) is heated in an open test tube under conditions sufficiently mild that it is not volatilized before it is converted, it may be safely estimated that this part of the process has been carried out at least several millions of times by chemists, starting with F. Wohler, none of whom ever thoroughly analyzed the product. Once in a great while the product analysis was carried to the point of establishing that an insoluble material was formed. This was, with grave uniformity, called ammelide. Hantsch, Berichte, 38, 1010, had the temerity to call it cyanuric triureide, but was brought to heel by Werner, Journal of the Chem. Soc. of London, 103, 1019, 2276.

There is some truth in certain of these incunabula. Ammelide is very often found. And Hantsch's product has an empirical formula very close to that of melamine cyanurate. It seems entirely possible that some of these ancient recipes might have given small amounts of melamine cyanurate. If so, it went undetected and unreported. (In this connection, it may be noted that melamine cyanurate has been known in the published patents, e.g., British 583,504, only since about 1947.)

A critical part of the instant process is the manner in which the cyanuric acid is brought up to reaction temperature. In this initial phase of the process I apply heat with a gentle suasion. I have found that if too much heat is immediately applied the cyanuric acid simply depolymerizes to HNCO and departs from the scene. The idea is to transform, not to shatter. This I do by starting with a relatively cool system, say, room temperature, and bringing the heat up gradually to about 350–400° C. over a period of at least about ½ hour. A longer warmup can be used, if desired. Shorter times result in a loss of cyanuric acid.

After reaction temperature is reached, heating is continued for at least another 2 hours, and preferably at least 10–15 hours. During this time a peek at the cyanuric acid shows little or no visible change, except for a slight discoloration along the edges. And yet an internal transformation has taken place, and some of the cyanuric acid has been changed to melamine cyanurate. The heating is stopped, the apparatus is allowed to cool, and the reaction product is slurried in warm water at, say 90° C., using about 10 ml. water/g. reaction product. Unreacted cyanuric acid goes into solution. Some insoluble material remains. This is mostly melamine cyanurate (which is highly insoluble in neutral water) with a little ammelide. Enough alkali (and preferably an excess) must now be added to free the melamine from its cyanurate salt and to keep the free cyanuric acid in solution as alkali cyanurate. Accordingly, the pH of the solution is increased to 10 by the addition of NaOH. Everything, even ammelide and ammeline, is now in solution. The solution is allowed to cool. As it cools, melamine crystallizes out, and is recovered by filtration and drying.

It must be emphasized that there is no free melamine in the product at the completion of the pyrolysis, and the customary tests for melamine (picrate, cyanurate, etc.) will show no melamine. It is essential to appreciate that the melamine is present not as free melamine but as a salt. This being understood, it may then be recovered by addition of alkali to the pyrolysis product and recovery in known ways, e.g., neutralization with aqueous NaOH (enough to hold all cyanuric acid in solution) and simple crystallization.

The following run was made in accord with the above general technique.

Example 1

Cyanuric acid (10.49 g.) was placed in a test tube and inserted into a small (100 cc.) bomb. This unit was thrice flushed with nitrogen to dry the system and finally brought to atmospheric pressure. Leaving the vent line open to the atmosphere, the unit was heated to 370° C. (0.5 hour required) and maintained at this temperature for 12 hours. No pressure was registered on the bomb gage during this period. The product (7.70 g.) analyzed 4.0% melamine, 17% ammeline, and 64% cyanuric acid. These results indicate melamine was produced with a 9.0% conversion and in 16.1% of the theoretical yield, assuming that 3 moles cyanuric acid will give 1 mole of melamine.

I claim:
1. In the method of making melamine comprising heating cyanuric acid as the sole melamine-forming reactant at atmospheric pressure the steps comprising (a) slowly heating the cyanuric acid initially at about room temperature to a temperature in the range of 350–400° C. over a period of at least 30 minutes; (b) continuing heating at 350–400° C. for at least 2 hours, whereby a reaction mass is formed comprising melamine cyanurate; (c) treating the reaction mass with at least a stoichiometric amount of aqueous alkali to react with the melamine cyanurate and free the melamine therefrom; (d) and recovering melamine from the resulting solution.

2. The method according to claim 1 in which step (a) is carried out by heating from room temperature to 370° C. and step (b) is carried out by heating at 370° C. for about 12 hours.

References Cited in the file of this patent
UNITED STATES PATENTS 2,566,231   Paden et al. _____ Aug. 28, 1951

FOREIGN PATENTS 583,504   Great Britain _____ Dec. 19, 1946
598,175   Great Britain _____ Feb. 12, 1948
645,600   Great Britain _____ Nov. 1, 1950
560,215   Canada _____ July 8, 1958

OTHER REFERENCES

Chemical Abstracts, vol. 50, p. 7114 (1956) [Abstract of Kinoshita, Rev. Phys. Chem., Japan, 25, pages 34–37 (1955)].

Nebbia et al.: La Chemica e L'Industria, vol. 39, No. 2, pages 81 to 83 (1957).

Chemical Abstracts, vol. 52, col. 13, 525 (1958) [abstracts of Kazarnovskii et al., Trudy Gor'kovsk Politek. Inst., vol. 11, No. 3, pages 56–61 (1957)].